United States Patent [19]

Hasegawa et al.

[11] Patent Number: 5,496,868
[45] Date of Patent: Mar. 5, 1996

[54] SEALING MATERIAL AND METHOD

[75] Inventors: Hajime Hasegawa, Chigasaki; Kazuyoshi Usami, Yokohama, both of Japan

[73] Assignee: Bridgestone Corporation, Tokyo, Japan

[21] Appl. No.: 237,101

[22] Filed: May 3, 1994

[30] Foreign Application Priority Data

May 21, 1993 [JP] Japan .................................. 5-142976

[51] Int. Cl.$^6$ .................................................. C08G 18/00
[52] U.S. Cl. .................... 521/155; 521/170; 521/174; 521/133; 528/48; 528/52; 528/76; 528/85; 528/492; 528/502 R; 528/503; 524/589; 524/590; 524/609; 524/924; 156/145
[58] Field of Search ..................................... 521/155, 170, 521/174, 133; 528/48, 52, 76, 85, 492, 502, 503; 524/589, 590, 609, 924; 156/145

[56] References Cited

U.S. PATENT DOCUMENTS

| | | |
|---|---|---|
| 3,772,224 | 11/1973 | Marlin et al. |
| 4,264,743 | 4/1981 | Maruyama et al. ............... 521/101 |
| 4,275,172 | 6/1981 | Barth et al. ....................... 521/112 |
| 4,412,013 | 10/1983 | Chang . |

FOREIGN PATENT DOCUMENTS

| | | |
|---|---|---|
| 1009007 | 11/1965 | United Kingdom . |
| 1374745 | 11/1974 | United Kingdom . |

*Primary Examiner*—James J. Seidleck
*Assistant Examiner*—Duc Truong
*Attorney, Agent, or Firm*—Sughrue, Mion, Zinn, Macpeak & Seas

[57] ABSTRACT

A sealing material is prepared by furnishing a liquid composition comprising a polydiene or polyolefin polyol, a polyisocyanate compound, a foam stabilizer, and a blowing agent, uniformly dispersing an inert gas in the liquid composition by mechanical agitation to form a bubbled composition, shaping the bubbled composition into a sheet shape, and heat curing the bubbled shape at a temperature below the decomposition temperature of the blowing agent. The sealing material is lightweight and has a high blowing magnification. On use, the sealing material is disposed in a cavity of an automotive pillar or similar member and heated for foaming to fill the cavity with the foamed product.

13 Claims, No Drawings

SEALING MATERIAL AND METHOD

BACKGROUND OF THE INVENTION

1. Field of the Invention

This invention relates to a sealing material which is disposed in a cavity of a pillar or another member in an automobile and heated for foaming into a polyurethane foam with which the cavity is filled and a method for providing a seal using the same.

2. Prior Art

Automobile center pillars and other frame members have a hollow cavity. Common practice is to fill the cavity with a foam for the purposes of preventing wind noise and absorbing vibration. The cavity is filled with a foam by various methods. For example, foam previously shaped to the cavity shape is inserted into the cavity through an access opening. Alternatively, a foamable material which is capable of foaming and expanding upon heating is placed in the cavity as a spot sealing material and later foamed to fill the cavity by heat encountered in a furnace for baking electrodeposited paint coating.

The former method of inserting a shaped foam body into a cavity, however, has the problem that the cavity is filled to a varying extent partially because of insertion through an access opening. It is difficult to completely fill the cavity along its configuration from corner to corner. The access opening which is often defined by punching out strip steel is dangerous in that the worker would have his hands injured.

The latter method also suffers from several problems. Sealing materials known as spot sealing material generally have, at most, a blowing size twice as large as what it was. Where a large volume must be filled, a large amount of sealing material is needed, which increases not only the cost, but also the weight against the general demand of lightweight automobiles.

SUMMARY OF THE INVENTION

Therefore, an object of the present invention is to provide a highly foamable sealing material which is lightweight and in a small amounts can fully fill a cavity in a pillar in an automobile. Another object of the present invention is to provide a method for providing a seal using the sealing material.

According to a first aspect of the invention, there is provided a sealing material which is prepared by furnishing a liquid composition comprising a compound having at least two active hydrogen atoms, an organic polyisocyanate compound, a foam stabilizer, and a blowing agent, uniformly dispersing an inert gas in the liquid composition by mechanical agitation to form a bubbled composition, shaping the bubbled composition into a predetermined shape, and heat curing the bubbled shape at a temperature below the decomposition temperature of the blowing agent. On use the sealing material is disposed in a cavity of a pillar or another member in an automobile and heated for foaming to fill the cavity.

Preferably the sealing material has a density of less than 1.0 g/cm$^3$. The compound having at least two active hydrogen atoms includes at least 50 parts by weight of a polydiene polyol or polyolefin polyol terminated with a hydroxyl group per 100 parts by weight of the compound. The liquid composition has an isocyanate index of 50 to 100.

According to a second aspect, a method for providing a seal in a cavity of a pillar or another member in an automobile includes the steps of disposing a sealing material as defined above in the cavity, and heating the sealing material at a temperature equal to or above the decomposition temperature of the blowing agent for foaming and expansion, thereby filling the cavity with the foamed product. Preferably the foamed product has a density of up to 0.2 g/cm$^3$.

The sealing material of the present invention is disposed in a cavity of a pillar or another member in an automobile and heated for foaming to fill the cavity. Since an inert gas is previously uniformly dispersed in a liquid composition comprising a compound having at least two active hydrogen atoms, an organic polyisocyanate compound, a foam stabilizer, and a blowing agent by mechanical agitation, the resulting bubbled composition is lightweight and the bubbles therein are stable due to the presence of a foam stabilizer. The bubbled composition is shaped into a predetermined shape, for example, a sheet and thereafter, heat cured at a temperature below the decomposition temperature of the blowing agent into a foamable shape that is the sealing material. When this foamable shape or sealing material is heated at or above the decomposition temperature of the blowing agent, for example, during a paint coat baking or drying step, the blowing agent is decomposed to incur foaming. This final foaming, coupled with the previous uniform dispersion of inert gas bubbles, ensures a high blowing magnification. Therefore, the cavity in the automobile pillar or the like can be fully filled with a small amount of the sealing material. When the compound having at least two active hydrogen atoms includes at least 50% by weight, based on the weight of the compound, of a polydiene polyol or polyolefin polyol terminated with a hydroxyl group, the composition experiences greater volume expansion by decomposition gases of the blowing agent. Better blowing properties are obtained when the liquid composition has an isocyanate index of 50 to 100.

DETAILED DESCRIPTION OF THE INVENTION

The sealing material of the present invention starts with a liquid composition comprising a compound having at least two active hydrogen atoms, an organic polyisocyanate compound, a foam stabilizer, and a blowing agent.

The compound having at least two active hydrogen atoms is generally selected from the liquid compounds which are conventionally used in the preparation of polyurethane and reactive with organic polyisocyanate compounds, preferably polydienic polyols or polyolefinic polyols terminated with a hydroxyl group.

Preferred polydienic polyols terminated with a hydroxyl group are liquid ones having a number average molecular weight of 300 to 25,000, more preferably 500 to 10,000. Exemplary are diene polymers having 4 to 12 carbon atoms, diene copolymers, and copolymers of such a diene monomer with an α-olefinic addition polymerizable monomer having 2 to 22 carbon atoms. A useful polybutadiene type liquid rubber is commercially available under the trade name "Poly bd R-45HT" from Idemitsu Petro-Chemical Industry K.K.

Preferred polyolefinic polyols terminated with a hydroxyl group are obtained by polymerizing an aliphatic unsaturated hydrocarbon represented by the general formula $C_nH_{2n}$ having one carbon-to-carbon double bond in a molecule into an oligomer and introducing at least two hydroxyl groups per molecule in the oligomer by any desired method. Preferred are polyols having a polyolefinic hydrocarbon skeleton having a number average molar weight of 1,000 to 5,000. Exemplary polyols are polyethylene, polypropylene, polybutene, and polyisobutylene. Most preferably, these polyols have a hydroxyl group introduced at either end. Such a double ended hydroxyl-terminated polyolefinic polyol is commercially available under the trade name "Epol" from Idemitsu Petro-Chemical Industry K.K.

Preferably the polydienic or polyolefinic polyol blend occupies at least 50 parts by weight in 100 parts by weight of the compound having at least two active hydrogen atoms. With lesser contents, the foamed product would sometimes have low compression strength a and poor appearance.

The organic polyisocyanate compound is generally selected from the compounds which are conventionally used in the preparation of polyurethane, for example, tolylene diisocyanate (TDI) and diphenylmethane-4,4'-diisocyanate (MDI).

Preferably the liquid composition has an isocyanate index of 50 to 100, especially 70 to 90. Though not always, with an isocyanate index of less than 50, the bubbled composition would not be coagulative enough to shape. With an isocyanate index of more than 100, the foam shape would be too coagulative to allow full expansion and less tacky.

In order to stabilize the bubbled composition obtained by admitting an inert gas a foam stabilizer is used. Suitable foam stabilizers are organic silicon surfactants. Useful organic silicon compounds are available under the trade names of L-501, L-520, L-532, L-540, L-544, L-3550, L-5502, L-5320, L- 5420, SZ-1618, and Y-6827 from Nippon Unicar K.K. and F-114, F-121, F-305, and F-317 from Shin-Etsu Silicone Co., Ltd. Preferably the foam stabilizer is blended in amounts of 0.1 to 5 parts, especially 0.3 to 3 parts by weight per 100 parts by weight of the compound having at least two active hydrogen atoms.

The blowing agent is selected from the substances which are decomposed by heating to generate carbon dioxide, nitrogen and other gases, preferably the substances which evenly generate gases at a temperature of about 130° to 210° C. Examples include azodicarbonamide, dinitrosopentamethylenetetramine, 4,4'-oxybis-benzenesulfonylhydrazide, azobisisobutyro-nitrile, and para-toluenesulfonylhydrazide alone or a mixture thereof. The blowing agent is preferably blended so as to provide a blowing magnification of at least 5, especially 6 to 30.

The composition used as the raw material of the foamable shape of the present invention essentially contains the above-mentioned components while fillers, crosslinking agents, catalysts and other agents conventionally used in the preparation of polyurethane may be optionally blended.

The filler may be a conventional filler used in polyurethane, for example, calcium carbonate. It is preferred to blend less amounts of the filler in order to prevent the foamable shape from increasing is density. More particularly, the filler may be blended in amounts of 0 to 100 parts, especially 10 to 30 parts by weight per 100 parts by weight of the compound having at least two active hydrogen atoms.

In the practice of the invention, an inert gas is mechanically admixed into the liquid composition to provide a bubbled composition. Such a bubbled composition is prepared by mechanically agitating an inert gas such as air and nitrogen gas into the liquid by high shearing means such as a Hobart mixer and Oakes mixer whereby the inert gas is uniformly dispersed as bubbles in the liquid phase comprising the active hydrogen-bearing compound, isocyanate and the like. At this point, the foam stabilizer serves to maintain the stability of the bubbles.

The amount of inert gas introduced is not critical although the inert gas is preferably introduced such that the bubbled composition may have a density of less than 1.0 g/cm$^3$, especially 0.3 to 0.95 g/cm$^3$.

The sealing material of the invention is obtained by shaping the bubbled composition into a predetermined shape to form a bubbled shape, and curing the shape at a temperature below the decomposition temperature of the blowing agent. The bubbled composition may be shaped to a configuration corresponding to the configuration of a cavity to be filled and the shaping method is not particularly limited. Often the composition is shaped into a sheet, for example, by passing the composition between spaced rollers along with release paper.

The bubbled shape should be cured at a temperature below the decomposition temperature of the blowing agent. Such curing is generally effected at about 40° to 90° C. for about 5 to 20 minutes. The bubbled shape after curing constitutes the sealing material of the invention.

On use, the sealing material is disposed in a cavity to be filled and then heated at a temperature equal to or above the decomposition temperature of the blowing agent whereby the sealing material is foamed and expanded to fill the cavity therewith. For example, a predetermined amount of the sealing material is disposed in a cavity in an automobile pillar whereupon the material is foamed and expanded concurrently with the drying or baking step of electrodeposited paint coating. The cavity is thus filled with the foamed product. Preferably the foamed product has a density of up to 0.2 g/cm$^3$.

The sealing material or cured bubbled shape of the present invention can be attached to the inner wall of the cavity since the shape is tacky. Since the sealing material is a bubbled shape having inert gas introduced therein, it is lightweight. The tackiness and light weight ensure that the sealing material, when attached to a vertical surface of the cavity inner wall, does not sag, slide down or fall down. Thus as long as the sealing material is disposed in place, the cavity can be fully filled with the foamed product.

The sealing material of the invention is advantageously used not only in filling cavities in automotive pillars and other members, but also for vibration damping in electric washing machines, refrigerators and air conditioners and for heat insulation and buffer in electric and other parts.

The sealing material of the invention features light weight and a high blowing magnification so that a large cavity can be filled with a relatively small amount (or lower weight) of the sealing material. The foamed product resulting from this material is of quality. The sealing material and method of the invention is thus effective in reducing weight and cost and best suited for filling cavities in automotive pillars and other members.

EXAMPLE

Examples of the present invention are given below by way of illustration and not by way of limitation. All parts are by weight.

Examples 1–12, Comparative Examples 1–6 & Reference Example

Uniformly and finely bubbled compositions were prepared by blending a polyol, a polyisocyanate, a crosslinking agent, a catalyst, a silicone foam stabilizer, calcium carbonate, and a blowing agent as reported in Table 1 in an Oakes mixer and introducing air into the mixture while agitating.

Each bubbled composition was applied on release paper to a thickness of 2 mm by means of a roller and cured at 60° C. for 15 minutes to produce a foamable sheet (sealing material) having uniformly distributed cells or bubbles. The density of the sheet was measured.

The foamable sheet was heated in a constant temperature over at 170° C. for 15 minutes to produce a foamed product. The foamed product was measured for blowing magnification, density and compression strength. The outer appearance was visually observed. The criteria for judging compression strength and appearance are shown below.

Compression strength

⊚: very strong
○: strong
×: easily collapsed by force

Appearance

○: good
Δ: flattened and spread
×: tacky surface, coarse cells

The results are shown in Table 1. It is to be noted that Comparative Example 1 is a rubber base sealing material commercially available under the trade name of Thermabeta from Nitto Denko K.K.

TABLE 1

|  | Comparative Example |  |  |  |  |  | Example |  |  |  |
|---|---|---|---|---|---|---|---|---|---|---|
|  | 1 | 2 | 3 | 4 | 5 | 6 | 1 | 2 | 3 | 4 |
| Composition, pbw | | | | | | | | | | |
| Polyol | | | | | | | | | | |
| OH - terminated polybutadiene A | — | — | — | 100 | — | — | 100 | 100 | — | — |
| OH - terminated polybutadiene B | — | — | — | — | — | — | — | — | 100 | 100 |
| OH - terminated polyisoprene | — | — | — | — | 100 | — | — | — | — | — |
| OH - terminated polyolefin | — | — | — | — | — | 100 | — | — | — | — |
| Trifunctional polyol A | — | — | 100 | — | — | — | — | — | — | — |
| Trifunctional polyol B | — | 100 | — | — | — | — | — | — | — | — |
| Polyisocyanate | | | | | | | | | | |
| amount | — | 38 | 34.1 | 34.1 | 34.7 | 35.9 | 21.7 | 27.9 | 35 | 35 |
| isocyanate index | — | 110 | 110 | 110 | 110 | 110 | 70 | 90 | 70 | 70 |
| Crosslinking agent | — | 4.0 | 4.0 | 4.0 | 4.0 | 4.0 | 4.0 | 4.0 | 4.0 | 4.0 |
| Catalyst | — | 0.01 | 0.01 | 0.01 | 0.01 | 0.01 | 0.01 | 0.01 | 0.01 | 0.01 |
| Foam stabilizer | — | 1.5 | 1.5 | 1.5 | 1.51 | 1.5 | 1.5 | 1.5 | 1.5 | 1.5 |
| Calcium carbonate | — | 10 | 10 | 10 | 10 | 10 | 10 | 10 | — | 20 |
| Blowing agent | — | 15 | 15 | 15 | 15 | 15 | 15 | 15 | 5 | 15 |
| Test | | | | | | | | | | |
| Sheet density (g/cm$^3$) | 1.89 | 0.83 | 0.87 | 0.85 | 0.86 | 0.89 | 0.85 | 0.86 | 0.82 | 0.85 |
| Foam density (g/cm$^3$) | 0.15 | 0.21 | 0.16 | 0.43 | 0.57 | 0.45 | 0.04 | 0.12 | 0.03 | 0.06 |
| Blowing magnification | 13 | 4 | 5 | 2 | 1.5 | 2 | 19 | 7 | 26 | 14 |
| Compression strength | — | × | × | ○ | ⊚ | ⊚ | ○ | ○ | ○ | ○ |
| Appearance | — | × | × | Δ | Δ | Δ | ○ | ○ | ○ | ○ |

|  | Example |  |  |  |  |  | Reference | Example |  |
|---|---|---|---|---|---|---|---|---|---|
|  | 5 | 6 | 7 | 8 | 9 | 10 | Example | 11 | 12 |
| Composition, pbw | | | | | | | | | |
| Polyol | | | | | | | | | |
| OH - terminated polybutadiene A | — | — | — | — | — | — | — | — | — |
| OH - terminated polybutadiene B | 100 | 100 | 100 | 100 | 70 | 50 | 30 | — | — |
| OH - terminated polyisoprene | — | — | — | — | — | — | — | 100 | — |
| OH - terminated polyolefin | — | — | — | — | — | — | — | — | 100 |
| Trifunctional polyol A | — | — | — | — | — | — | — | — | — |
| Trifunctional polyol B | — | — | — | — | 30 | 50 | 70 | — | — |
| Polyisocyanate | | | | | | | | | |
| amount | 35 | 35 | 45 | 50 | 31.7 | 29.6 | 27.4 | 22 | 22.9 |
| isocyanate index | 70 | 70 | 90 | 100 | 70 | 70 | 70 | 70 | 70 |
| Crosslinking agent | 4.0 | 4.0 | 4.0 | 4.0 | 4.0 | 4.0 | 4.0 | 4.0 | 4.0 |
| Catalyst | 0.01 | 0.01 | 0.01 | 0.01 | 0.01 | 0.01 | 0.01 | 0.01 | 0.01 |
| Foam stabilizer | 1.5 | 1.5 | 1.5 | 1.5 | 1.5 | 1.5 | 1.5 | 1.5 | 1.5 |
| Calcium carbonate | 40 | 80 | — | — | 10 | 10 | 10 | 10 | 10 |
| Blowing agent | 15 | 15 | 15 | 15 | 15 | 15 | 15 | 15 | 15 |
| Test | | | | | | | | | |
| Sheet density (g/cm$^3$) | 0.89 | 0.95 | 0.83 | 083 | 0.85 | 0.86 | 0.84 | 0.83 | 0.88 |
| Foam density (g/cm$^3$) | 0.07 | 0.07 | 0.06 | 0.12 | 0.09 | 0.14 | 0.14 | 0.05 | 0.09 |
| Blowing magnification | 12 | 15 | 15 | 7 | 9 | 6 | 6 | 15 | 10 |
| compression strength | ⊚ | ⊚ | ○ | ⊚ | ○ | ○ | × | ○ | ○ |
| Appearance | ○ | ○ | ○ | ○ | ○ | ○ | × | ○ | ○ |

TABLE 1-continued

Note:
OH - terminated polybutadiene A: number average molecular weight 1200, hydroxyl value 105.5, trade name Poly bd R - 15H, Idemitsu Petro - Chemical Industry K.K.
OH - terminated polybutadiene B: number average molecular weight 2800, hydroxyl value 46.6, trade name Poly bd R - 45H, Idemitsu Petro - Chemical Industry K.K.
OH - terminated polyisoprene: number average molecular weight 2490, hydroxyl value 46.6, trade name Poly IP, Idemitsu Petro - Chemical Industry K.K.
OH - terminated polyolefin: number average molecular weight 2500, hydroxyl value 50.5, trade name Epol, Idemitsu Petro - Chemical Industry K.K.
Trifunctional polyol A: number average molecular weight 4000, hydroxyl value 42, Mitsubishi Chemicals K.K.
Trifunctional polyol B: number average molecular weight 3000, hydroxyl value 56, Mitsubishi Chemicals K.K.
Polyisocyante: modified MDI based on 4,4'-diphenyl-methanediisocyanate, trade name Sumidur PF, Sumitomo Bayer Urethane K.K.
Crosslinking agent: 1,4-butanediol
Catalyst: dibutyltin dilaurate
Foam stabilizer: trade name SZ - 1618, Nippon Unicar K.K.
Blowing agent: 4,4'-oxybisbenzenesulfonyl hydrazide (blowing temperature 155–160° C.)

The foamed products of 30 mm thick obtained in Examples 1 and 3 were measured for percent absorption of perpendicularly incident sound to find that they had better sound absorption over a wider frequency range than a conventional flexible polyurethane foam (specific gravity 0.02, 25% hardness 2 kgf). The foamed product obtained in Example 3 was measured for transmission loss to find that it had an equivalent transmission loss over a wider frequency range as compared with a conventional asphalt-urethane integrally foamed product (density 0.1 g/cm$^3$, 25% hardness 60 kgf).

Although some preferred embodiments have been described, many modifications and variations may be made thereto in light of the above teachings. It is therefore to be understood that within the scope of the appended claims, the invention may be practiced otherwise than as specifically described.

We claim:

1. A sealing material which is disposed in a cavity of a pillar or another member in an automobile and heated for foaming to fill the cavity, said sealing material being prepared by a process comprising the steps of furnishing a liquid composition comprising a compound having at least two active hydrogen atoms, an organic polyisocyanate compound, a foam stabilizer, and a blowing agent which generates gases at a temperature of about 130° to 210° C., uniformly dispersing an inert gas in the liquid composition by mechanical agitation to form a bubbled composition, shaping the bubbled composition into a predetermined shape, and heat curing the bubbled shape at a temperature below the decomposition temperature of said blowing agent.

2. A sealing material according to claim 1 wherein said compound having at least two active hydrogen atoms includes at least 50 parts by weight of a polydiene polyol or polyolefin polyol terminated with a hydroxyl group per 100 parts by weight of said compound.

3. A sealing material according to claim wherein said liquid composition has an isocyanate index of 50 to 100.

4. A sealing material according to claim 1 which has a density of less than 1.0 g/cm$^3$.

5. A method for providing a seal in a cavity of a pillar or another member in an automobile, comprising the steps of disposing a sealing material according to any one of claims 1 to 4 in the cavity and heating the sealing material at a temperature equal to or above the decomposition temperature of the blowing agent for foaming and expansion, thereby filling the cavity with the foamed product.

6. A method according to claim 5 wherein said foamed product has a density of up to 0.2 g/cm$^3$.

7. A method for providing a seal in a cavity of a pillar or another member in an automobile, comprising the steps of:

disposing a sealing material in the cavity of the pillar or another member in the automobile; wherein the sealing material is prepared by a process comprising the steps of furnishing a liquid composition comprising a compound having at least two active hydrogen atoms, an organic polyisocyanate compound, a foam stabilizer, and a blowing agent, uniformly dispersing an inert gas in the liquid composition by mechanical agitation to form a bubbled composition, shaping the bubbled composition into a predetermined shape, and heat curing the bubbled shape at a temperature below the decomposition temperature of the blowing agent which generates gases at a temperature of about 130° to 210° C.; and heating the sealing material at a temperature equal to or above the decomposition temperature of the blowing agent for foaming and expansion, thereby filling the cavity with the foamed product.

8. The method according to claim 7, wherein said compound having at least two active hydrogen atoms includes at least 50 parts by weight of a polydiene polyol or polyolefin polyol terminated with a hydroxyl group per 100 parts by weight of said compound.

9. The method according to claim 7, wherein said liquid composition has an isocyanate index of 50 to 100.

10. The method according to claim 7, wherein the sealing material has a density of less than 1.0 g/cm$^3$.

11. The method according to claim 7, wherein said foamed product has a density of up to 0.2 g/cm$^3$.

12. The sealing material according to claim 1 wherein the blowing agent is added so as to provide a blowing magnification of at least 5.

13. The sealing material according to claim 1 wherein the blowing agent is azodicarbonamide, dinitrosopentamethylenetetramine, 4,4'-oxybis-benzenesulfonylhydrazide, azobisisobutyronitrile, and para-toluenesulfonylhydrazide alone or a mixture thereof.

* * * * *